(12) United States Patent
Chae et al.

(10) Patent No.: US 11,102,749 B2
(45) Date of Patent: Aug. 24, 2021

(54) METHOD AND APPARATUS FOR ACQUIRING RANGING INFORMATION BY TERMINAL IN WIRELESS COMMUNICATION SYSTEM SUPPORTING DEVICE TO DEVICE COMMUNICATION

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/635,992

(22) PCT Filed: Aug. 3, 2018

(86) PCT No.: PCT/KR2018/008847
§ 371 (c)(1),
(2) Date: Jan. 31, 2020

(87) PCT Pub. No.: WO2019/027287
PCT Pub. Date: Feb. 7, 2019

(65) Prior Publication Data
US 2020/0178199 A1 Jun. 4, 2020

Related U.S. Application Data

(60) Provisional application No. 62/541,045, filed on Aug. 3, 2017.

(51) Int. Cl.
*H04W 64/00* (2009.01)
*H04W 4/70* (2018.01)
(Continued)

(52) U.S. Cl.
CPC ........ *H04W 64/003* (2013.01); *G05D 1/0061* (2013.01); *H04B 7/0621* (2013.01);
(Continued)

(58) Field of Classification Search
CPC ......... H04W 76/14; H04W 4/40; H04W 4/44; H04W 4/023; H04W 76/23; H04W 4/70;
(Continued)

(56) References Cited

U.S. PATENT DOCUMENTS

2005/0090266 A1\* 4/2005 Sheynblat ........... H04W 64/006
455/456.1
2009/0228172 A1 9/2009 Markyvech et al.
(Continued)

FOREIGN PATENT DOCUMENTS

| WO | 2016160611 | 10/2016 |
| WO | 2016182295 | 11/2016 |
| WO | 2017007386 | 1/2017 |

OTHER PUBLICATIONS

Bostov et al., "Location Dependent Resource Allocation for Mobile Device-to-Device Communications", 2014, IEEE, 6 pages. (Year: 2014).\*

(Continued)

*Primary Examiner* — Quoc Thai N Vu
(74) *Attorney, Agent, or Firm* — Lee Hong Degerman Kang Waimey

(57) ABSTRACT

Various embodiments provide a method and an apparatus for acquiring ranging information by a terminal in a wireless communication system supporting device to device (D2D) communication. Specifically, disclosed are a method and an apparatus for acquiring ranging information by a terminal, the method comprising the steps of: receiving, from a road side unit (RSV), a ranging signal including location information of the RSU; transmitting a feedback signal to the
(Continued)

RSU, in a resource region determined on the basis of geographic information of the terminal; and receiving a response signal from the RSU, as a response to the feedback signal, and acquiring ranging information on the basis of the received response signal, wherein the response signal further includes ranging information of another terminal which has received the ranging signal and transmitted a feedback signal.

12 Claims, 18 Drawing Sheets

(51) Int. Cl.
    *H04W 4/029*     (2018.01)
    *G05D 1/00*     (2006.01)
    *H04B 7/06*     (2006.01)
    *H04L 5/00*     (2006.01)
    *H04W 72/04*     (2009.01)

(52) U.S. Cl.
    CPC ........... *H04L 5/0053* (2013.01); *H04W 4/029* (2018.02); *H04W 4/70* (2018.02); *H04W 72/0446* (2013.01); *H04L 5/0023* (2013.01)

(58) Field of Classification Search
    CPC ... H04W 4/029; H04W 64/00; H04W 64/003; H04W 72/0446; G08G 1/0116; Y02D 30/70; Y02D 70/1262; Y02D 70/1264; Y02D 70/142; Y02D 70/144; Y02D 70/162; Y02D 70/164; Y02D 70/166; Y02D 70/21; Y02D 70/24; Y02D 70/25; G05D 1/0061; H04B 7/0621; H04L 5/0023; H04L 5/0053; H04L 5/0069
    See application file for complete search history.

(56) References Cited

U.S. PATENT DOCUMENTS

| | | |
|---|---|---|
| 2013/0315099 A1 | 11/2013 | Chen et al. |
| 2015/0036598 A1* | 2/2015 | Kilpatrick, II .... H04W 36/0055 370/329 |
| 2015/0215903 A1* | 7/2015 | Zhao ..................... H04W 72/04 370/329 |
| 2016/0227485 A1* | 8/2016 | Davydov ............ H04W 52/242 |
| 2016/0249316 A1* | 8/2016 | Kudekar ............... G01S 5/0284 |
| 2018/0302768 A1* | 10/2018 | Uchiyama ............... H04W 4/44 |
| 2019/0035269 A1* | 1/2019 | Donovan ............. G05D 1/0293 |
| 2020/0228948 A1* | 7/2020 | Watfa .................... H04W 36/08 |

OTHER PUBLICATIONS

PCT International Application No. PCT/KR2018/008847, Written Opinion of the International Searching Authority dated Nov. 28, 2018, 21 pages.

* cited by examiner (a)

(b)

(a)

(b)

(a)

(b)

(a)

(b)

METHOD AND APPARATUS FOR ACQUIRING RANGING INFORMATION BY TERMINAL IN WIRELESS COMMUNICATION SYSTEM SUPPORTING DEVICE TO DEVICE COMMUNICATION

CROSS-REFERENCE TO RELATED APPLICATIONS

This application is the National Stage filing under 35 U.S.C. 371 of International Application No. PCT/KR2018/008847, filed on Aug. 3, 2018, which claims the benefit of U.S. Provisional Application No. 62/541,045 filed on Aug. 3, 2017, the contents of which are all hereby incorporated by reference herein in their entirety.

TECHNICAL FIELD

The present disclosure relates to a method and apparatus for acquiring ranging information by a user equipment (UE) from a road side unit in a wireless communication system supporting device to device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to provide a method and apparatus for acquiring ranging information by a user equipment (UE) from a road side unit (RSU) in a wireless communication system, in which the UE which has received a ranging signal periodically transmitted from the RSU transmits a feedback signal from a resource region determined based on geographical information of the UE and receives a response signal including ranging information measured by the RSU based on the feedback signal to measure a position of the UE more exactly.

Another object of the present disclosure to provide a method and apparatus for acquiring ranging information by a user equipment (UE) from a road side unit (RSU) in a wireless communication system, in which the UE identifies a peripheral status more exactly by acquiring its ranging information and ranging information on another peripheral UE from the response signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to one aspect of the present disclosure, a method for acquiring ranging information by a user equipment (UE) in a wireless communication system supporting device to device (D2D) communication comprises receiving, from a road side unit (RSU), a ranging signal including position information of the RSU, transmitting a feedback signal from a resource region determined based on geographical information of the UE to the RSU, and receiving a response signal from the RSU in response to the feedback signal and acquiring ranging information based on the received response signal, wherein the response signal further includes ranging information of other UEs which have received the ranging signal and transmitted the feedback signal.

According to an embodiment, the response signal further includes attribute information on the feedback signal corresponding to the ranging information.

Or, the attribute information is information on at least one of resource and sequence to which the feedback signal is transmitted.

Or, the UE identifies its ranging information from the ranging information of the other UEs based on the attribute information.

Or, the UE determines a resource region corresponding to the geographical information based on at least one of resource information on a plurality of resource regions divided based on the geographical information and parameter information of a mapping function for determining a resource region according to the geographical information.

Or, the response signal includes position information of the UE, and the position information is acquired based on information on a direction where the RSU receives the feedback signal and the ranging information.

Or, the feedback signal is transmitted from the determined resource region when the ranging signal is received at intensity of a preset threshold value or more.

Or, the feedback signal is transmitted by selecting at least one resource element within the determined resource region based on ID of the UE and using the selected resource element.

Or, the resource information or the parameter information is configured differently per RSU.

Or, the resource information and the parameter information are previously signaled by a network to the UE through a physical layer signal or a higher layer signal.

Or, if a specific one of the other UEs is located within a preset threshold distance with the UE, the response signal further includes a notification signal indicating that the UE is close to the specific UE.

Or, if the UE is a UE for any one of a plurality of vehicles driving in a group, the response signal is transmitted to only the UE for any one of the plurality of vehicles.

Or the geographical information on the UE is determined based on coordinate information of the UE, which is measured using a global positioning system (GPS) included in the UE.

Or, a transmission power of the feedback signal is determined based on intensity of the received ranging signal.

Or, a sequence index or sequence ID of the feedback signal is determined based on intensity of the received ranging signal.

Or, the feedback signal includes at least one of information on the time when the RSU receives a ranging signal and information on a phase difference according to propagation delay between tones of the ranging signal received by the RSU.

Or, the UE retransmits the feedback signal by changing the determined resource region or a transmission power if the response signal is not received.

Advantageous Effects

In the present disclosure according to various embodiments, the UE which has received a ranging signal may transmit a feedback signal from a resource region determined based on geographical information of the UE and acquire ranging information measured by the RSU from a response signal transmitted from the RSU in response to the feedback signal, whereby position of the UE may be measured more exactly.

Also, the UE may identify a peripheral status more exactly by acquiring its ranging information and ranging information on another peripheral UE from the response signal.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
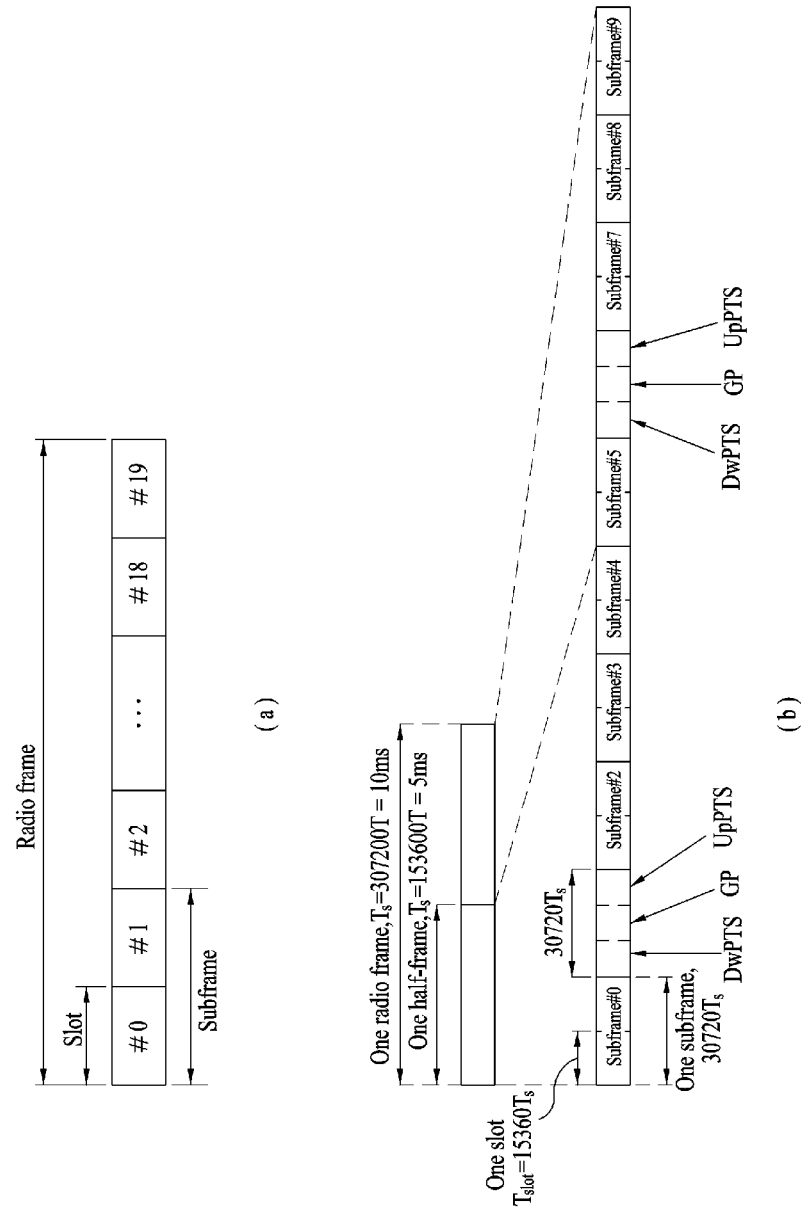
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
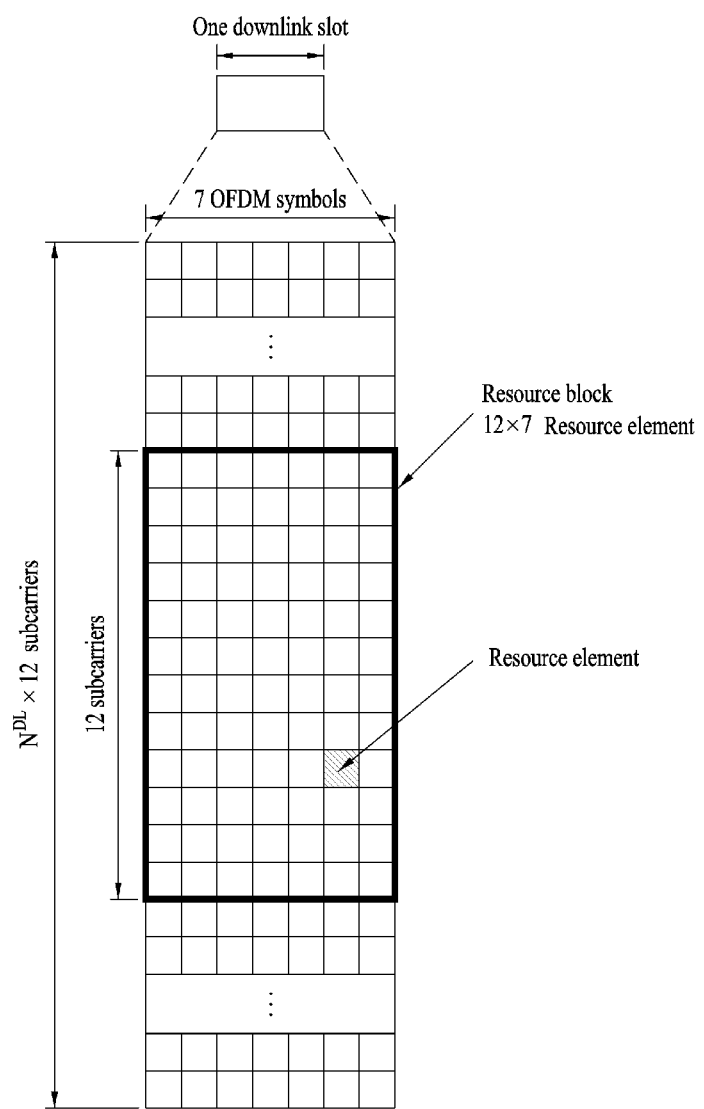
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
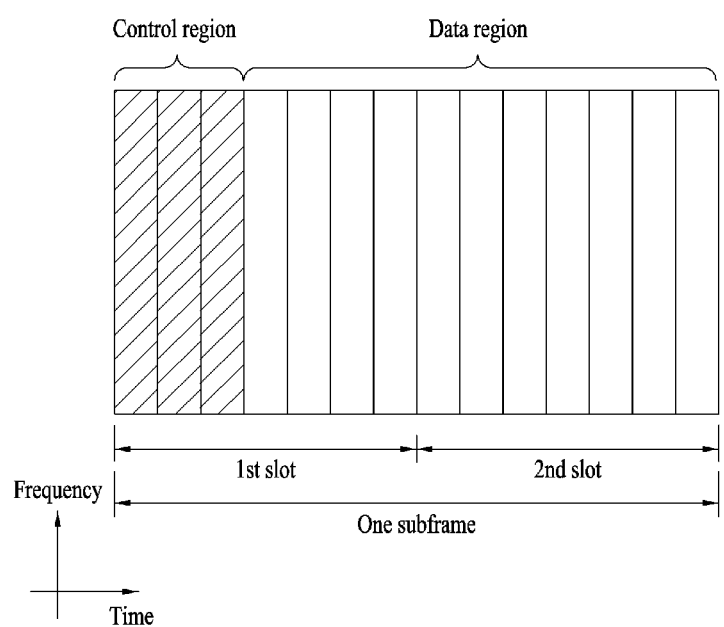
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
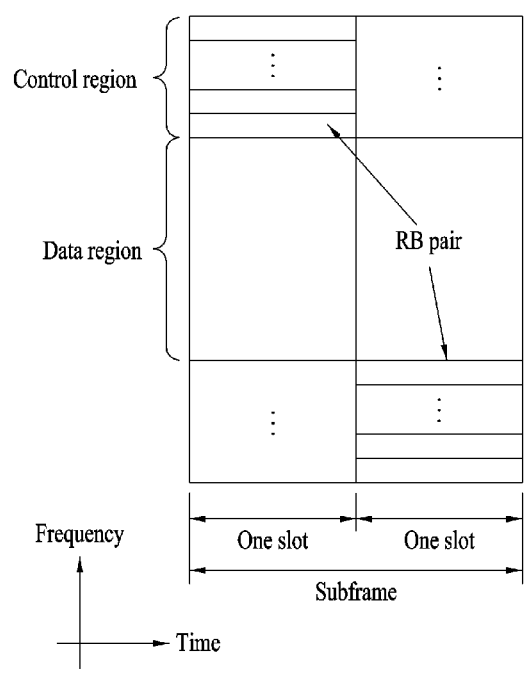
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
i) Demodulation-reference signal (DM-RS) used for channel estimation for coherent demodulation of information delivered on a PUSCH and a PUCCH; and
ii) Sounding reference signal (SRS) used for an eNB or a network to measure the quality of an uplink channel in a different frequency.

The downlink RSs are categorized into:
i) Cell-specific reference signal (CRS) shared among all UEs of a cell;
ii) UE-specific RS dedicated to a specific UE;
iii) DM-RS used for coherent demodulation of a PDSCH, when the PDSCH is transmitted;
iv) Channel state information-reference signal (CSI-RS) carrying CSI, when downlink DM-RSs are transmitted;
v) Multimedia broadcast single frequency network (MBSFN) RS used for coherent demodulation of a signal transmitted in MBSFN mode; and
vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
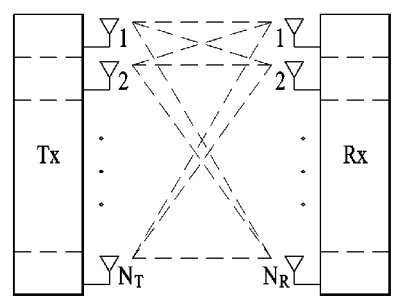
FIG. 5 is a view illustrating the configuration of a wireless communication system having multiple antennas.
Figure 5:
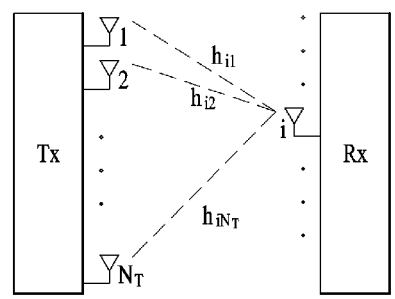

FIG. 5 is a diagram illustrating a configuration of a wireless communication system having multiple antennas.

As shown in FIG. 5(a), if the number of Tx antennas is increased to NT and the number of Rx antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ $T_X$ antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots s_{N_T}$, respectively. If the transmit powers are set to $p_1, p_1, \ldots, p_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, y_N$, of the antennas can be expressed as follows.

$$y = [y_1, y_2, \ldots y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$m = [n_1, n_2, \ldots n_{N_R}]^T \quad \text{[Equation 9]}$$

Through the above-described mathematical modeling, the received signals can be expressed as follows.

$$y = \quad \text{[Equation 10]}$$

$$\begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
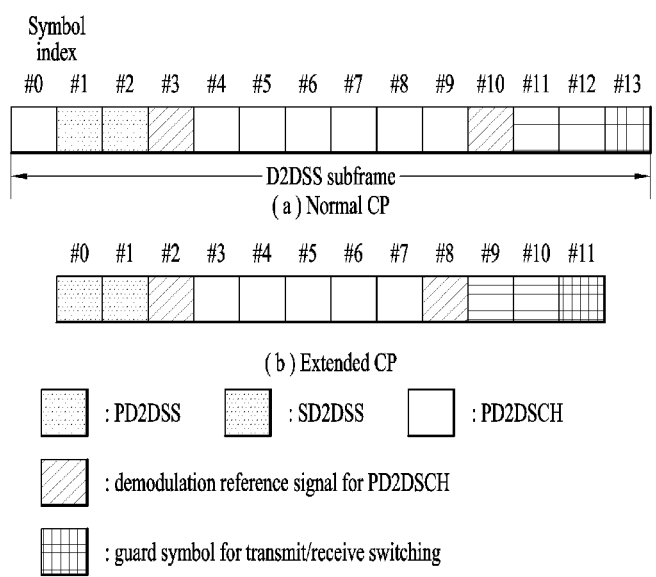
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be anode that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
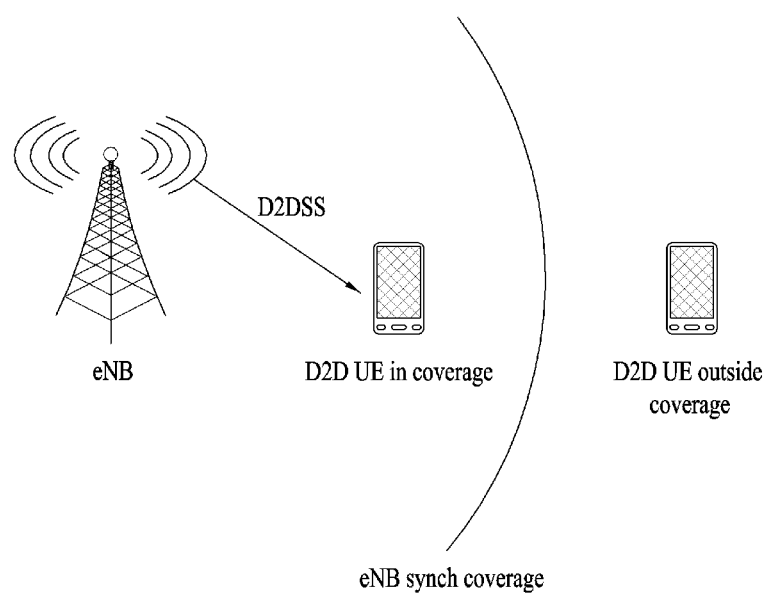
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
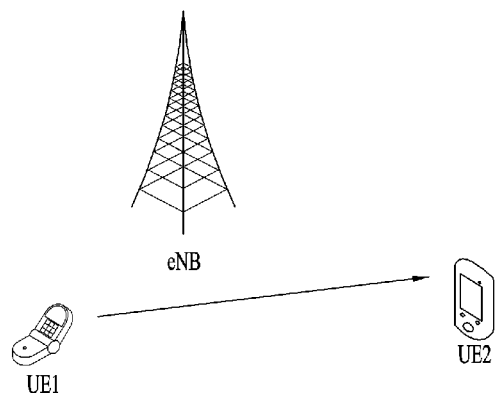
FIG. 8 is a view illustrating an exemplary D2D resource pool for D2D communication.
Figure 8:
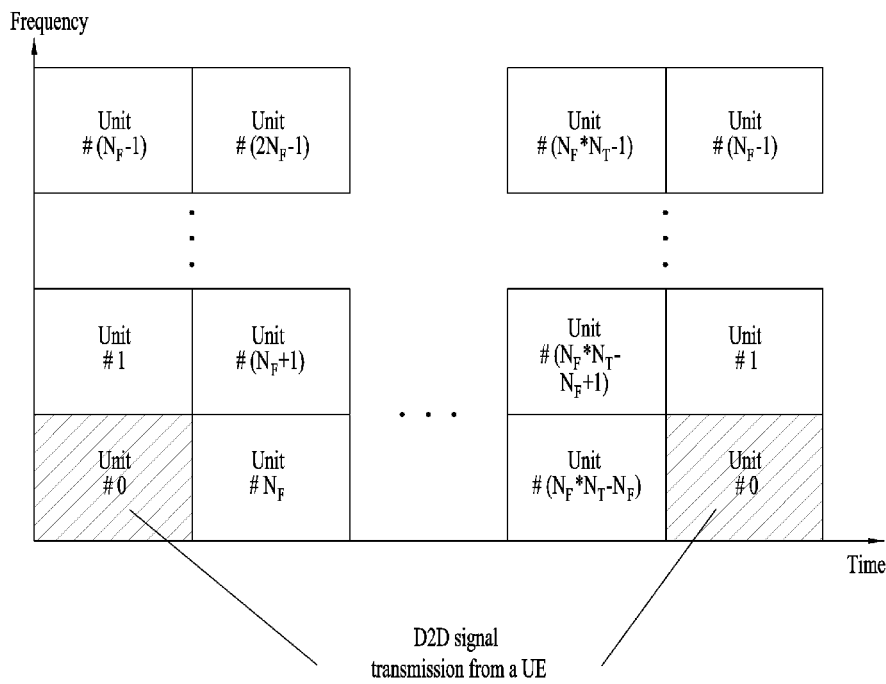

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the NT number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
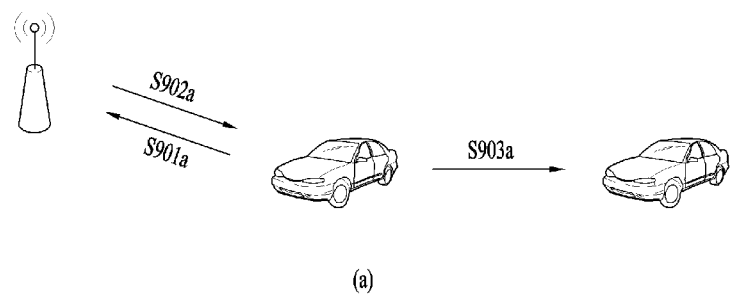
FIG. 9 is a view referred to for describing transmission modes and scheduling schemes for vehicle-to-everything (V2X)
Figure 9:
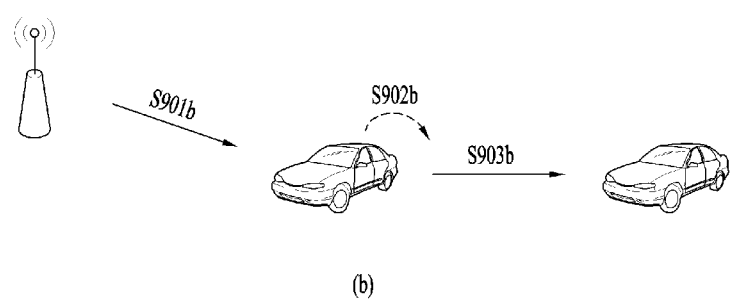
Figure 10:
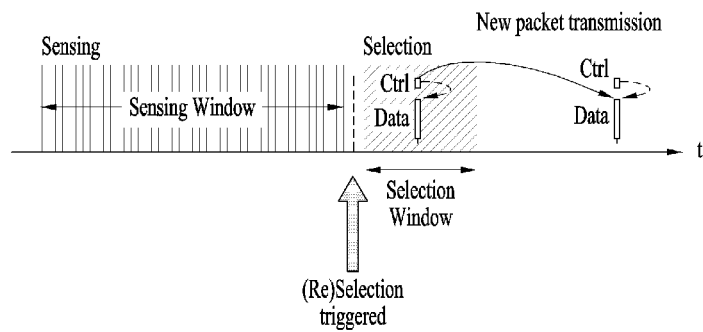
FIG. 10 is a view illustrating a method of selecting resources in V2X.
Figure 11:
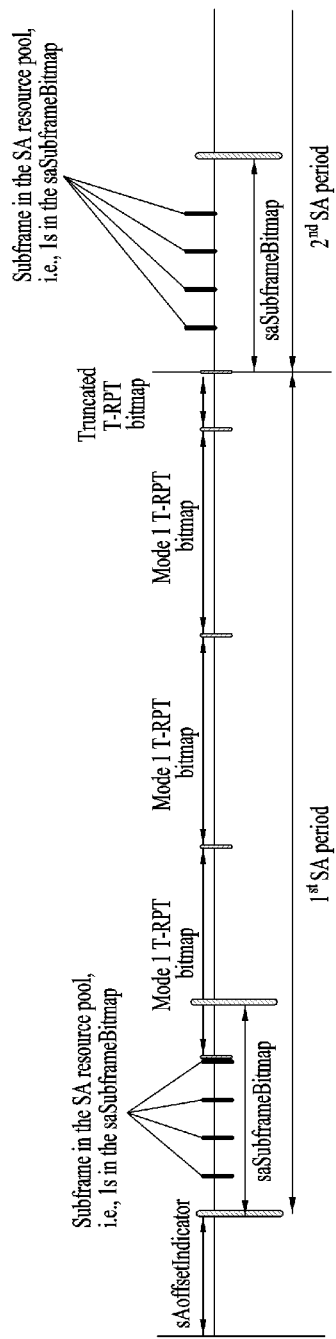
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1 s in a T-RPT bitmap, and one MAC PDU is transmitted four times.

Figure 12:
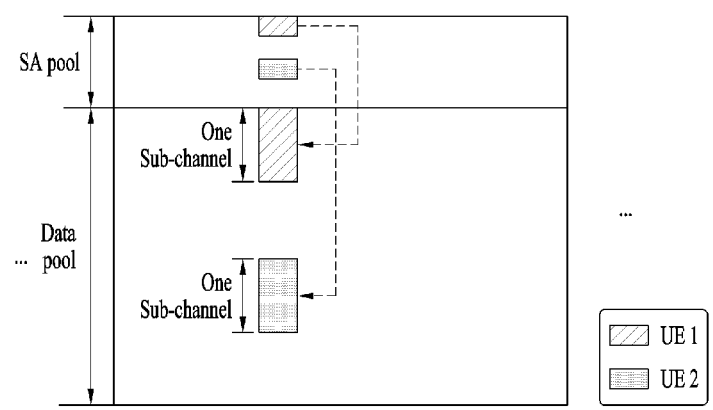
FIG. 12 is a view referred to for describing an SA and data transmission in V2X.
Figure 12:
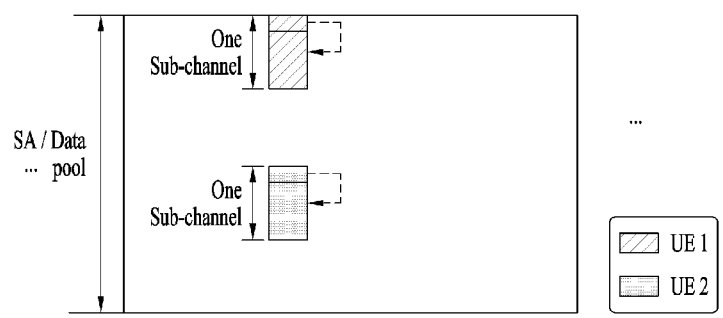

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

NR (New RAT(Radio Access Technology))

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
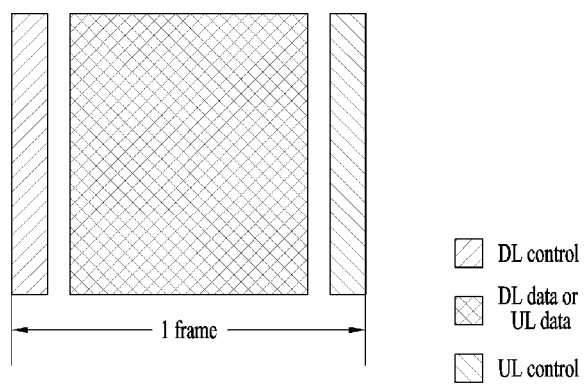
FIGS. 13 and 14 are views illustrating a new radio access technology (NRAT) frame structure.
Figure 14:
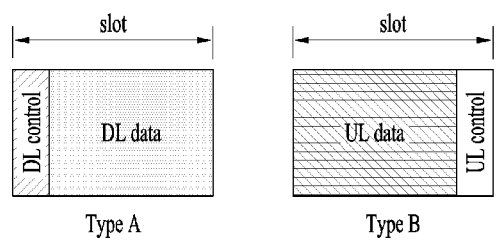
Figure 14:
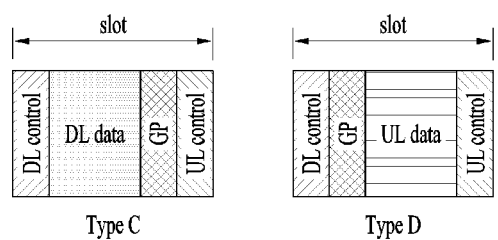

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Meanwhile, carrier aggregation may be used even in case of D2D communication to improve a data transmission rate or reliability. For example, a receiving UE may receive a signal from aggregated carriers, perform combining or joint decoding or deliver a decoded signal to a higher layer, thereby performing (soft) combining for signals transmitted from different carriers. However, for this operation, since the receiving UE needs to identify what carriers are aggregated, that is, carriers of which signals should be combined, it is required to indicate radio resources of the aggregated carriers. In the legacy 3GPP Rel. 14 V2X, a transmitting UE directly indicates a time frequency position to which data (PSSCH) is transmitted, by using a control signal (PSCCH). However, if carrier aggregation is indicated through PSCCH, additional bit field is required for this indication. However, reserved bits remaining in the current PSCCH are 5 to 7 small bits, approximately. Therefore, a method for indicating radio resources of effectively aggregated carriers is required. Hereinafter, detailed methods related to this case will be described.

RSU Aided Ranging and Positioning

The present disclosure suggests a method for determining transmission and reception resources and transmission signals for ranging/positioning in D2D communication. Hereinafter, a unit of which position is fixed or previously delivered to a UE or peripheral UEs through a physical layer signal or a higher layer signal will be defined as a road side unit (RSU). The RSU may be a UE type (network access by wireless) or an eNB type (network access by wire). Meanwhile, among UEs, a UE of which position information is determined to be relatively exact may perform an operation equal to or similar to that of the RSU suggested in the following description.

Meanwhile, in case of V2X, position measurement of the UE through TDoA from a plurality of eNBs may not be proper in view of fast movement. In detail, in order to estimate a position of the UE based on TDoA, a series of procedures are required as follows. The plurality of eNBs need to receive a feedback signal from the UE and transmit the received feedback signal to a location server, and the location server needs to analyze the position of the UE and then feed the analyzed positon of the UE back to the eNB. However, in V2X of which position is quickly varied, since the position is varied even for a time period required for feedback according to the series of procedures, an error between the position information which is fed back and the current position of the UE is increased. Also, in case of V2X of which position should be measured per short time period, since a PRS period is too long, position measurement may not be proper. In this respect, position measurement of the UE through a new method is required. Hereinafter, a detailed method for position measurement will be described.

Basically, a signal for ranging and/or positioning may have a short transmission length in a time domain. Hereinafter, although a time unit for transmitting a signal for ranging and/or positioning is assumed as a subframe or slot unit unless mentioned separately, a transmission time interval (TTI) length less than the subframe or slot unit may be applied to the present disclosure.

Ranging may be performed in such a manner that a signal is directly transmitted or received between UEs or between a UE and an RSU. For example, if a signal is transmitted at a subframe n, the UE which has received the signal may transmit a feedback signal at a subframe n+k. At this time, if at least one or more UEs or RSUs simultaneously perform signal transmission and reception, it may be required to perform time division multiplexing (TDM) for resources for transmission and reception between the UE and the RSU.

The RSU may signal its position information and/or a ranging signal to a peripheral UE. After receiving the ranging signal, the UE may transmit a feedback signal after a certain time based on the time when the ranging signal is received, whereby the RSU may measure a distance with a specific UE. In the present disclosure, the ranging signal is a signal of a specific pattern known by a transceiver, and this signal means a signal that may be used for distance estimation and UE position estimation.

The signal transmitted by the RSU may be transmitted periodically. All or some of a signal period of individual RSU, a position of transmission resources, and subframe offset may previously be determined, or may be signaled to the UE through a physical layer signal or a higher layer signal. In order to avoid transmission resource collision between RSUs, the transmission resources between the RSUs may previously be configured by the network differently, or the transmission resources may be determined by ID of the RSU, or information of the transmission resources may be shared between the RSUs through a backhaul, or the RSU may determine its transmission resources by initially performing a sensing operation.

A rule may be determined, which allows the UE to transmit a feedback signal to RSU which transmits the largest signal or RSU of which signal intensity is a certain threshold value or more. This is to allow the UE to prevent from transmitting an inexact and unnecessary feedback signal to the RSU that is far away therefrom.

The UE may determine attributes of transmission resources and signals when transmitting a feedback signal. The feedback signal of the UE may be different per UE. The UE may determine all or some of time and frequency resources, sequence, comb repetition factor, and comb index, which are used, (for example, through sensing (method for identifying whether a specific resource is used by another peripheral UE and selecting a resource by avoiding the specific resource)), and may use an attribute indicated by the RSU, wherein all or some of them may be derived from ID of the UE, may be determined in accordance with a position of the UE, or may randomly be selected by the UE. In this case, a resource region of a feedback signal of the UE may previously be separated from a resource region used by the RSU. That is, the UE may be configured so as not to transmit a feedback signal by using a resource region transmitted by the RSU, thereby avoiding collision with the transmission signal of the RSU. To this end, a region to which the RSU previously transmits a signal for ranging/positioning may previously be determined, or may be indicated to the UE through a physical layer signal or a higher layer signal. Likewise, the resource region for ranging/positioning used by the UE may previously be determined, or may be indicated by the network through a physical layer signal or a higher layer signal.

Time/frequency resources and sequence used by the feedback signal may be determined differently depending on receiving intensity of RSU signal. For example, if receiving intensity from RSU A is a certain threshold value or more, the UE may use a resource region A to transmit the feedback signal, and if receiving intensity from RSU B is a certain threshold value or more, the UE may use a resource region B to transmit the feedback signal. In more detail, receiving intensity from a specific RSU may be divided into a plurality of steps (to this end, the network or RSU may configure a plurality ranges of a threshold value for the UE), wherein an available radio resource region may previously be configured in accordance with each receiving intensity step, and the UE may determine a transmission resource region for the feedback signal based on receiving intensity of a signal observed from the RSU. In this case, when a specific RSU receives signals by using different resources between UEs which have received signals per RSU, the signals may be received at a similar power, whereby a near far effect may be attenuated. At this time, the UE which transmits a signal to a specific RSU may measure pathloss between the corresponding RSU and the UE and perform open loop power control for controlling a transmission power in accordance with the pathloss. In this case, PO and alpha which are used may previously be determined, or may be indicated by the network or indicated to the UE by the RSU. Alternatively, at least one of a threshold value for signal receiving intensity per RSU, information on RSU with which a specific resource region is associated, and a condition of signal intensity of RSU for using a specific resource region may be signaled to the UE by the network (or RSU) through a physical layer signal or a higher layer signal.

Alternatively, resources or resource regions which are used may be configured differently depending on a positon (or geographical information) of the UE. For example, a feedback signal transmission resource/resource region used by the UE located in a region A may be different from a feedback signal transmission resource/resource region used by the UE located in a region B. This is to reduce a near far effect between the UEs. In this case, at least one of a resource or resource region used depending on the position of the UE, the number of resource regions and all or some of parameters of a mapping function of a resource region based on position may be signaled by the network to the UE through a physical layer signal or a higher layer signal.

Meanwhile, when the UE determines a resource or resource region of a feedback signal in accordance with one of the above methods, signals or resources should be transmitted differently between individual UEs. This is to allow the RSU to identify a UE from which each signal is transmitted. For example, the UEs which have received the signal from RSU A may transmit a feedback signal by using their respective time or frequency resources. In case of phase difference of arriving (PDoA) or in the case that a feedback signal is transmitted using some frequencies only, (when a distance is close or the probability of LOS link is high), different frequency resources (REs, tones) may be used between the UEs. In this case, resources used by each UE may be determined by ID of the UE, may directly be indicated by the RSU, may randomly be selected, or may be determined by the UE through sensing. In case of time difference of arrival (TDoA), a position of resource or sequence used by the UE may be different. At this time, the position of resource or sequence may randomly be selected, or may be selected differently depending on ID of the UE, may be determined by the UE through sensing, or may be selected differently depending on the position of the UE.

Moreover, in case of PDoA, the UE may perform feedback for used frequencies (minimum two tones) that include phase rotation information according to propagation delay. In this case, another UE or RSU may estimate a distance based on the feedback signal including the phase rotation information. Alternatively, in case of TDoA, each UE may feed back a given signal after a preset time based on the time when the signal is received from the RSU, and the RSU may measure a distance between UEs or between UE and RSU by measuring a time delay per signal used by each UE.

According to an embodiment, the RSU which has received the feedback signal may broadcast distance information of each UE to a peripheral UE by measuring a distance with each UE (measuring distances with peripheral UEs at one time). For example, the RSU may signal information on a distance owned by a corresponding UE to a peripheral UE through a physical layer signal or a higher layer signal. Meanwhile, the RSU may not know all IDs of UEs or may not recognize ID which has been used. In this case, since the RSU may know attributes (time and frequency resources, sequence index, comb repetition factor, comb index) when the UE transmits a feedback signal, the RSU may feed back distance information associated with the above attributes. When receiving the feedback signal transmitted by the UE in time frequency resource 1, the RSU can transmit information on the time frequency resource 1 and corresponding distance information to the UE.

In this way, when the RSU measures ranging information of a peripheral UE and feeds back the ranging information, the RSU may broadcast the ranging information to the peripheral UEs or signal the ranging information to each UE. If the ranging information is broadcast to peripheral UEs, each UE may acquire ranging information of the other UEs as well as its ranging information. In this case, each UE may exactly estimate a positon of the other UEs by using its ranging information or ranging information of the other UEs.

The RSU may estimate a detailed position per UE by measuring angle of arrival (AoA) information as well as distance information. The RSU may calculate position information of the UE if the distance information with the UE and the AoA information are acquired. This position information may be signaled to the peripheral UEs through a physical layer signal or a higher layer signal. The RSU may signal ID of the UE and the position of the UE, and the UE which has received them may identify the position of the peripheral UE from the RSU.

The position information of the UE may be broadcast to the peripheral UE, or position information of individual UE may be signaled by unicast. According to an advantage of the former case, if a specific UE receives a broadcast message that includes position information, since the UE may identify position information of another peripheral UE, relative positioning with another vehicle becomes available. At this time, ID of the UE and the position information of the UE may be included in the broadcast message in due order. Information as to bits owned by a corresponding field and information as to how many fields exist may be included in MAC header of the broadcast message. If the position information is broadcast by the RSU, and if it is determined that two specific vehicles are geographically close to each other in vehicle communication, the UE may get out of the risk of vehicle collision by quickly changing its position, moving direction, speed, etc. In case of the latter case, since each UE is signaled its position information only from the RSU, the UE cannot identify position information of the other UE. At this time, if the RSU determines that collision with a specific vehicle will occur, the RSU may signal collision warning information to a vehicle of which collision is predicted, through a physical layer signal or a higher layer signal.

Meanwhile, the present disclosure is not limited to D2D communication, and may be used even for an uplink or a downlink. At this time, an eNB or relay node may use the method suggested as above. Since examples of the suggested method described as above may be included in one of the implementation methods of the present disclosure, it will be apparent that the examples may be regarded as suggested methods. Also, the suggested methods may be implemented independently, but some of them may be implemented in the form of combination (or incorporation). A rule may be defined such that information (or information on rules of the suggested methods) as to whether the suggested methods will be applied may be notified from the eNB to the UE or from a transmitting UE to a receiving UE through a previously defined signal (for example, physical layer signal or higher layer signal).

Figure 15:
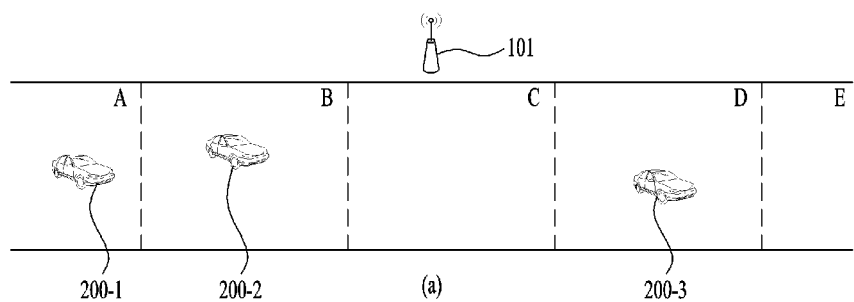
FIG. 15 is a view illustrating a method for determining a resource region in accordance with geographical information of a UE according to an embodiment.
Figure 15:
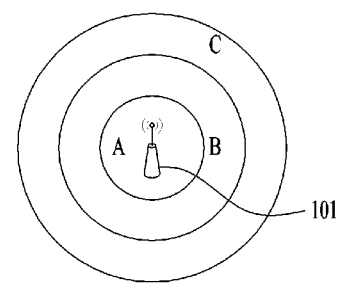

FIG. 15 is a view illustrating a method for determining a resource region in accordance with geographical information of a UE according to an embodiment.

Referring to FIG. 15(a), a resource region to which the feedback signal is transmitted may be determined based on geographical information. In detail, the resource region may previously be configured to each region. That is, a region A, a region B, a region C, a region D and a region E may respectively be mapped into a first resource region, a second resource region, a third resource region, a fourth resource region, and a fifth resource region in a one-to-one relationship. In this case, the first to fifth resource regions may be configured as different resource regions, or may be configured as partially overlapped resource regions.

In this case, the UE 200 may determine a corresponding resource region based on geographical information acquired by itself. In this case, the geographical information may be coordinate information of the UE, which is measured using a global positioning system (GPS) included in the UE. For example, if a second resource region is previously configured as a resource region corresponding to the region B and it is determined that the second resource region is arranged in the region B based on the geographical information acquired through the GPS, the UE may determine the second resource region previously configured to correspond to the region B as a resource region for transmitting the feedback signal.

Next, the UE may determine specific resource elements based on its ID information in the second resource region. For example, in case of time difference of arrival (TDoA), the UE may specify a position of resources or sequence used in the determined resource region based on its ID information. Alternatively, in case of phase difference of arriving (PDoA), the UE may specify different frequency resources (REs, tones) used in the determined resource region based on its ID information. Also, the UE may randomly determine specific resource elements within the second resource region. In this method, the UE may transmit a feedback signal by selecting resources which are not overlapped with peripheral UEs, whereby collision between the feedback signals of the UEs may be minimized.

Also, referring to FIG. 15(b), the UE may determine a corresponding resource region based on the geographical information acquired by itself, wherein the geographical information may be determined based on receiving intensity of a signal of the RSU 101. That is, peripheral regions may be identified in accordance with receiving intensity of the signal of the RSU. In detail, the peripheral regions may be divided into a region A where receiving intensity of the signal of the RSU is more than a first threshold value, a region B where receiving intensity of the signal of the RSU is smaller than the first threshold value but is more than a second threshold value, and a region C where receiving intensity of the signal of the RSU is smaller than the second threshold value but is more than a third threshold value. In this case, the UE may acquire geographical information (or region information) corresponding to itself in accordance with receiving intensity of a ranging signal received from the RSU. For example, if the ranging signal of which receiving intensity is smaller than the second threshold value and more than the third threshold value is received, the UE may determine the resource region corresponding to the region B as a resource region for transmitting the feedback signal. Moreover, a size of the resource included in the resource region determined in each region may be set to be increased if the receiving intensity of the signal becomes smaller. For example, the size of the resource region may previously be set such that the resource region corresponding to the region A may include 10 resource blocks, the resource region corresponding to the region B may include 20 resource blocks, and the resource region corresponding to the region C may include 40 resource blocks.

In this way, the resource region for ranging may previously be divided into a plurality of resource regions based on GPS information, or may previously be divided into a plurality of resource regions in accordance with receiving intensity of a specific signal based on the RSU 101. In this case, the UE may acquire its geographical information based on the intensity of the signal received from the RSU or its GPS information and determine a corresponding resource region as a resource region for transmitting the feedback signal based on the acquired geographical information. That is, the UE may determine a resource region by any one of the aforementioned two methods depending on what the geographical information is, or the resource region may previously be indicated by the network.

Figure 16:
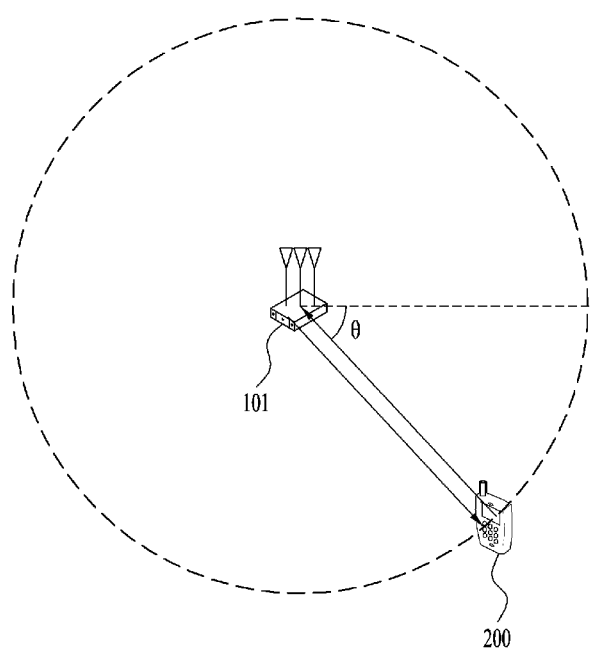
FIG. 16 is a view illustrating a method for calculating a position of a UE by an RUS in accordance with an embodiment.

FIG. 16 is a view illustrating a method for calculating a position of a UE by an RSU in accordance with an embodiment.

Referring to FIG. 16, the RSU 101 may acquire ranging information which is distance information with the UE by measuring time delay or phase rotation level from the feedback signal of the UE 200. Moreover, the RSU 101 may measure a receiving direction of the feedback signal of the UE as shown in FIG. 16.

In detail the RSU 101 may receive the feedback signal of the UE through multi-antennas. The RSU may acquire a receiving angle corresponding to the feedback signal of the UE and the ranging information. In this case, the RSU may exactly determine the position of the UE based on the receiving angle in a circle having a distance according to ranging information as a radius. That is, if the receiving angle of the feedback signal is measured through multi-antennas, the RSU may acquire the exact position of the UE based on the calculated ranging information and receiving angle.

Next, the RSU may transmit a response signal to the UE in response to the feedback signal. At this time, the response signal may include the ranging information and the receiving angle information. Alternatively, the response signal may include the ranging information and the receiving angle information, and the UE may directly calculate its position based on the receiving angle and ranging information acquired from the response signal and position information of the RSU included in the ranging signal. In this case, the UE may correct GPS coordinate information acquired from its GPS device based on position information which is acquired. In this way, the UE may calculate or acquire more exact position by correcting the position information according to the GPS device to the position information acquired by signal exchange through the RSU. Particularly, if the UE is a UE included in an autonomous vehicle, the vehicle may autonomously drive based on position information more exact than the GPS, whereby safety of autonomous driving may effectively be improved.

Figure 17:
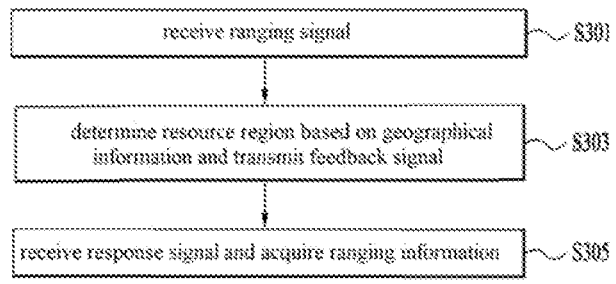
FIG. 17 is a flow chart illustrating a method for acquiring ranging information according to an embodiment of the present disclosure.

FIG. 17 is a flow chart illustrating a method for acquiring ranging information according to an embodiment of the present disclosure.

Referring to FIG. 17, the UE may receive a ranging signal from the RSU. The ranging signal may be a signal periodically transmitted from the RSU. The UE may previously be signaled from the network information a period of the RSU for transmitting a ranging signal and information on resources. Also, the UE may be signaled information such as a period of a ranging signal per RUS, a position of transmission resources, and subframe offset through a physical layer signal or a higher layer signal (S301).

Also, the resource to which the ranging signal is transmitted may previously be configured to be identified per RSU, and the UE may identify the RSU through the resource to which the ranging signal is transmitted by previously acquiring information on the resource to which the ranging signal is transmitted, per RSU. Also, the RSU may transmit its position information, which includes the ranging signal, or may broadcast the ranging signal to peripheral UEs.

Next, the UE may receive the ranging signal from the RSU and transmit the feedback signal to the RSU in response to the ranging signal. The UE may determine a transmission region to which the feedback signal will be transmitted, based on geographical information of the UE when transmitting the feedback signal. In this case, the geographical information may be coordinate information of the UE, which is directly determined by GPS, or may be region information determined based on intensity of the signal received from the RSU. In detail, the UE may determine a resource region corresponding to the geographical information based on the geographical information. The resource region may be determined as one of a plurality of resource regions divided depending on geographical information as shown in FIGS. 15(a) and 15(b) (S303).

According to an embodiment, the UE may previously be signaled transmission resource information for determining a corresponding resource region based on the geographical information from the RSU or the network. In this case, the transmission resource information may include resource information that includes a corresponding resource region in each of several regions or parameter information of a mapping function for determining the resource region according to the geographical information. That is, the UE may determine the resource region corresponding to its geographical information in the resource information or determine a resource region corresponding to its geographical information by using the parameter information.

Alternatively, the UE may transmit the feedback signal to the RSU when receiving intensity of the ranging signal reaches a preset threshold value or more. For example, if the receiving intensity of the ranging signal is weak, since the UE is not likely to be LOS with the RSU which has transmitted the ranging signal, the RSU may calculate inexact ranging information from the feedback signal. Therefore, if the receiving intensity of the ranging signal is less than a preset threshold value, the UE is limited so as not to transmit the feedback signal, whereby unnecessary resource waste and collision between signals may be minimized.

Next, the UE may determine a specific resource element in the determined resource region based on UE ID or randomly, whereby feedback signal collision with the other UEs may be minimized. That is, the UE may select a specific resource element within the determined resource region corresponding to its geographical information based on UE ID or randomly. The UE may transmit the feedback signal to the RSU by using the selected specific resource element. At this time, the UE may transmit the feedback signal, which includes information required by the RSU to calculate the ranging information, based on the received ranging signal. For example, the UE may transmit the feedback signal after a preset time based on the time when the ranging signal is received, or may transmit the feedback signal that includes phase rotation information according to propagation delay of the ranging signal.

According to an embodiment, the UE may determine a transmission power of the feedback signal based on the receiving intensity of the ranging signal. For example, the UE may measure pathloss between the RSU and the UE based on the receiving intensity of the signal, and may determine the transmission power of the feedback signal based on the pathloss in accordance with an open loop power control method. In this case, when a plurality of UEs respectively receive the ranging signals and transmit the feedback signals at a similar timing, even though the RSU receives the feedback signals at a similar timing, a difference in the receiving power between the feedback signals is not great. As a result, near far effect due to the difference in the receiving power between the feedback signals may effectively be attenuated.

Otherwise, the UE may determine sequence index or ID of the feedback signal based on the intensity of the ranging signal. For example, considering that it is not likely to be a line of sight (LOS) state if the receiving intensity of the ranging signal becomes weaker, the UE may determine a proper sequence that may solve this problem.

Otherwise, the UE may change a CP and frequency band for the feedback signal in accordance with the intensity of the ranging signal. For example, if the receiving intensity of the ranging signal becomes weaker, the UE may make the CP be longer or the frequency band to which the feedback signal is transmitted may be increased.

Next, the UE may acquire its ranging information by receiving a response signal, which is a response of the RUS to the feedback signal. The response signal may include ranging information calculated based on the feedback signal received by the RSU. Moreover, the response signal may further include ranging information of another UE located near the RSU (S305).

According to an embodiment, the response signal may further include attribute information on the feedback signal. The RSU may acquire attribute information on the feedback signal to indicate the feedback signal corresponding to the ranging information and include the attribute information in the response signal. That is, the response signal may include ranging information and matched attribute information corresponding to the ranging information. In this case, the UE may acquire its ranging information by detecting the ranging information matched with the attribute information corresponding to the feedback signal from the response signal. The attribute information of the feedback signal may be resource information to which the feedback signal is transmitted or information on sequence.

In detail, if the RSU receives feedback signals from a plurality of UEs, the RSU may calculate a plurality of kinds of ranging information based on each of the received feedback signals and broadcast a response signal that includes the plurality of kinds of calculated ranging information. In this case, the UE may acquire ranging information matched with attribute information corresponding to its feedback signal among the plurality of kinds of ranging information included in the response signal as its ranging information.

According to an embodiment, the UE may be located within a preset threshold distance with a specific another UE to identify the risk such as collision with the specific another UE through the response signal. In detail, the RSU may calculate position and ranging information of each of a plurality of UEs by receiving the feedback signals from the plurality of UEs. The RSU may determine whether the UE and the specific UE are located to be close to each other within the preset threshold distance, based on the calculated position information. If it is determined that the UE and the specific UE are located to be close to each other within the preset threshold distance, the RSU may transmit a response signal, which includes notification information indicating that the UE and the specific UE are located to be close to each other, to the UE.

Otherwise, if the UE is a UE corresponding to any one of a plurality of vehicles driving in a group, the response signal may be transmitted to only a vehicle designated as a main vehicle of the plurality of vehicles or driving at the forefront. That is, in case of vehicles driving in a group, since vehicles excluding the main vehicle or the forefront vehicle perform dependent driving with respect to the main vehicle or the forefront vehicle, the vehicles transmit information on peripheral vehicles to only the main vehicle. As a result, unnecessary resource waste may be avoided.

Meanwhile, each of the UEs driving in a group may transmit the feedback signal to correspond to the ranging signal, and the response signal may include ranging information of UEs corresponding to the vehicles driving in a group. In this case, the response signal is transmitted to any one of the UEs corresponding to the vehicles driving in a group, but the other peripheral UEs may acquire ranging information of all of the UEs corresponding to the vehicles driving in a group, from the response signal.

Figure 18:
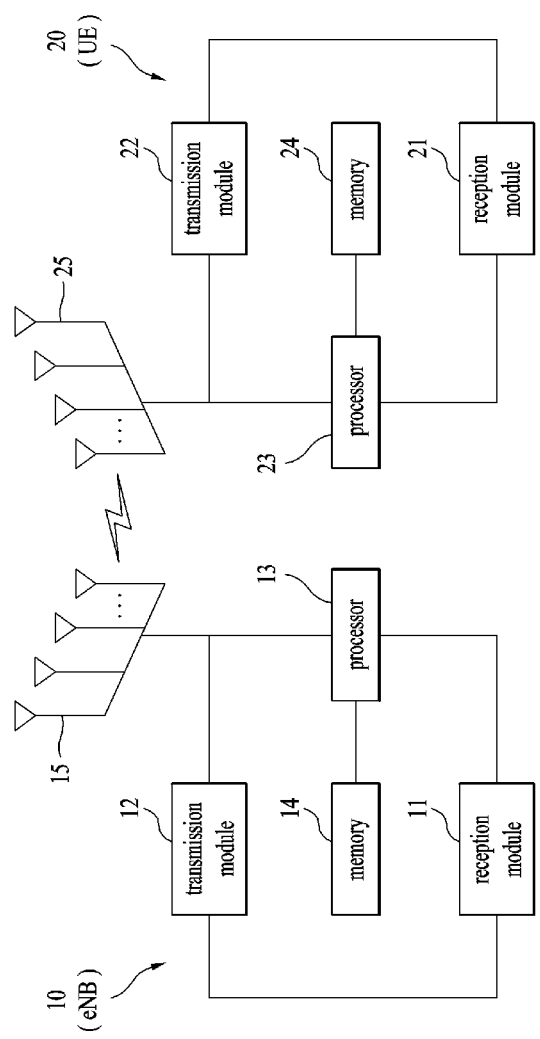
FIG. 18 is a view illustrating a configuration of a transceiving apparatus.

FIG. 18 is a view briefly illustrating a UE that performs D2D communication according to the present disclosure.

FIG. 18 is a block diagram of a transmission point and a UE according to an embodiment of the present disclosure.

Referring to FIG. 18, a transmission point 10 according to the present disclosure may include a receiving device 11, a transmitting device 12, a processor 13, a memory 14, and a plurality of antennas 15. Use of the plurality of antennas 15 means that the transmission point 10 supports MIMO transmission and reception. The receiving device 11 may receive various UL signals, data, and information from a UE. The transmitting device 12 may transmit various DL signals, data, and information to a UE. The processor 13 may provide overall control to the transmission point 10.

The processor 13 of the transmission point 10 according to an embodiment of the present disclosure may process requirements for each of the foregoing embodiments.

The processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 18, a UE 20 according to the present disclosure may include a receiving device 21, a transmitting device 22, a processor 23, a memory 24, and a plurality of antennas 15. Use of the plurality of antennas 25 means that the UE 20 supports MIMO transmission and reception. The receiving device 21 may receive various DL signals, data, and information from an eNB. The transmitting device 22 may transmit various UL signals, data, and information to an eNB. The processor 23 may provide overall control to the UE 20.

The processor 23 of the UE 20 according to an embodiment of the present disclosure may process the necessary matters in each of the above-described embodiments. In detail, the processor may receive ranging information, which includes position information of a road side unit (RSU), from the RSU, transmit a feedback signal from a resource region determined based on geographical information on the UE to the RSU, and acquire its ranging information by again receiving a response signal that includes the ranging information calculated based on the feedback signal. Also, the response signal may further include ranging information of other UEs which have transmitted the feedback signal by receiving the ranging signal from the RSU.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 18, the description of the transmission point 10 may also be applied to a relay as a DL transmission entity or a UL reception entity, and the description of the UE 20 may also be applied to a relay as a DL reception entity or a UL transmission entity.

The embodiments of the present disclosure may be implemented through various means, for example, in hardware, firmware, software, or a combination thereof In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method for acquiring ranging information by a user equipment (UE) in a wireless communication system supporting device to device (D2D) communication, the method comprising:
receiving, from a road side unit (RSU), a ranging signal including position information of the RSU;
transmitting a feedback signal to the RSU based on the ranging signal; and
receiving a response signal from the RSU, the response signal including distance information between the RSU and the UE,
wherein the feedback signal is transmitted in a resource region determined based on a reception strength of the ranging signal among a plurality of resource regions divided according to signal strength,
wherein the response signal includes sequence information and resource information related to the feedback signal, and
wherein the UE identifies whether the distance information is information calculated by the feedback signal based on the sequence information and the resource information included in the response signal.

2. The method of claim 1, wherein the plurality of resource regions is configured differently per RSU of a plurality of RSUs, the plurality of RSUs including the RSU.

3. The method of claim 1, wherein information on the plurality of resource regions corresponding to the RSU is previously signaled by a network to the UE through a physical layer signal or a higher layer signal.

4. The method of claim 1, wherein the feedback signal is transmitted from the determined resource region only when the reception strength of the ranging signal is equal to or greater than a predetermined threshold value.

5. The method of claim 1, wherein the feedback signal is transmitted in at least one resource element within the determined resource region, the at least one resource element determined based on an ID of the UE.

6. The method of claim 1, wherein, when the resource information and sequence information included in the response signal are different from resource information and sequence information for the feedback signal, the UE estimates a location of a neighboring UE based on ranging information included in the response signal.

7. The method of claim 1, wherein a transmission power of the feedback signal is determined based on the reception strength of the ranging signal.

8. The method of claim 1, wherein a sequence index or sequence ID of the feedback signal is determined based on the reception strength of the ranging signal.

9. The method of claim 1, wherein the feedback signal includes information on a reception time of the ranging signal or a phase difference between tones of the ranging signal.

10. The method of claim 1, wherein the UE retransmits the feedback signal by changing the determined resource region or a transmission power if the response signal is not received.

11. A UE for acquiring ranging information in a wireless communication system supporting device to device (D2D) communication, the UE comprising:
a transceiver; and
a processor
receiving, from a road side unit (RSU), a ranging signal including position information of the RSU by controlling the transceiver,
transmitting a feedback signal to the RSU based on the ranging signal, and
receiving a response signal from the RSU, the response signal including distance information between the RSU and the UE,
wherein the feedback signal is transmitted in a resource region determined based on a reception strength of the ranging signal among a plurality of resource regions divided according to signal strength, wherein the response signal includes sequence information and resource information related to the feedback signal, and wherein the UE identifies whether the distance information is information calculated by the feedback signal based on the sequence information and the resource information included in the response signal.

12. The UE of claim 11, wherein the processor is configured to receive a user input to switch a drive mode from an autonomous mode to a manual mode, or to switch from a manual mode to an autonomous mode.

* * * * *